(No Model.)

W. H. FOSSETT.
NUT LOCK.

No. 573,776. Patented Dec. 22, 1896.

WITNESSES:
Paul Johost
Wm. P. Patton

INVENTOR
W. H. Fossett
BY
Munn & Co.
ATTORNEYS.

UNITED STATES PATENT OFFICE.

WILLIAM H. FOSSETT, OF WALSENBURG, COLORADO.

NUT-LOCK.

SPECIFICATION forming part of Letters Patent No. 573,776, dated December 22, 1896.

Application filed April 22, 1895. Renewed September 16, 1896. Serial No. 606,059. (No model.)

*To all whom it may concern:*

Be it known that I, WILLIAM H. FOSSETT, of Walsenburg, in the county of Huerfano and State of Colorado, have invented a new and Improved Nut-Lock, of which the following is a full, clear, and exact description.

This invention relates to an improved nut-lock of the ratchet type, and has for its object to produce a novel simple device of the indicated character which will be adapted to secure the nut of a bolt at any desired point thereon, so as to prevent any rotatable displacement of the nut when it is suitably adjusted on the threaded body of the engaged bolt.

The invention consists in the construction and combination of parts, as hereinafter described, and indicated in the claim.

Reference is to be had to the accompanying drawings, forming a part of this specification, in which similar figures of reference indicate corresponding parts in all the views.

Figure 1:
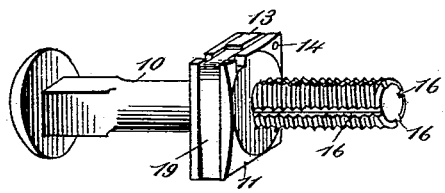
Figure 2:
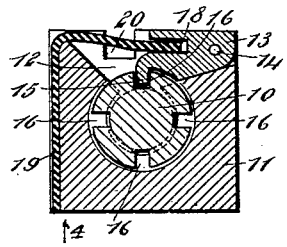
Figure 4:
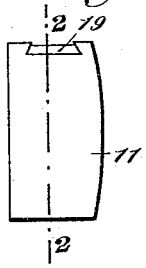
Figure 3:
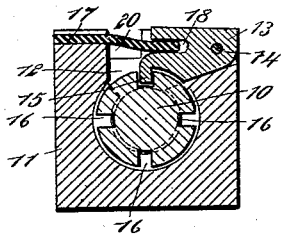
Figure 5:
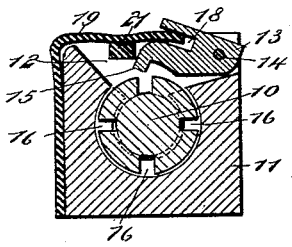

Figure 1 is a perspective view of a screw-bolt and nut thereon having the improvement applied. Fig. 2 is a transverse sectional view of the improvement and also of a bolt-body and nut thereon to which the nut-lock is applied and represented in a locked condition, the line of section being indicated at 2 2 in Fig. 4. Fig. 3 is a transverse sectional view of a bolt and a nut screwed thereon, showing the improved nut-lock slightly changed in form and adjusted to lock the nut on the bolt-body. Fig. 4 is a side view of a screw-nut having the improvement, showing preferred means for holding the detent-spring of the nut-lock attached to the nut, seen in direction of arrow 4 in Fig. 2; and Fig. 5 is a transverse sectional view of the bolt, nut, and preferred form of the improved nut-lock, similar to that represented in Fig. 2, showing the nut-lock adjusted to permit a free rotation of the nut for unscrewing it from the bolt.

The bolt 10 may have any dimensions and its threaded body cut with a coarse or fine thread, the nut 11, that contains features of the improvement, being threaded to fit it for a screwed engagement with the thread of the bolt. The bolt 11, shown to illustrate the application of the improvement, has a square marginal form, but the nut-lock may also be applied to a nut of hexagonal shape or be combined with a circular collar, if desired.

There is a suitable recess 12 produced in one side of the nut 11 between its ends, cutting into the threaded perforations of the nut and extending toward another side of the nut, so as to remove material at and below one corner of the latter, as shown clearly in Fig. 5.

A latch-dog 13 is located in the recess 12 and is pivoted to two walls, which are parts of the nut remaining at the sides of the recess, the said pivot 14 being introduced near the recessed corner of the nut and of the dog, as indicated in the drawings. The dog 13 has a toe 15 formed on its lower side at the free end of the same, which toe is bent downward at its ends, so as to be adapted to enter any one of a number of longitudinal grooves 16, that are produced in the bolt-body, and preferably the said grooves have parallel side walls which loosely embrace the parallel sides of the toe 15 when the latter enters any one of said grooves, whereby a secure lock is produced between the bolt and nut, holding the latter from rotation, and which can only be released by lifting the dog. The interlocking engagement of the toe 15 with either groove 16 of the bolt is enforced by a plate-spring, which may be of the length shown in Fig. 3, but is preferably afforded a greater length and increased elasticity, as indicated in Figs. 1, 2, and 5. The free end of the dog 13 is formed with a projecting lug located above and spaced apart from the toe 15 to form a recess 18 between these two parts.

As represented, the shorter spring 17 is attached by any suitable means at one end on the nut 11, so as to project the free end of the spring toward the dog 13 and into the recess 18, formed in said dog above the toe 15 thereon, so that the force of the spring may cause a depression of the dog, which is limited by the impinge of the lower side of said dog on the bottom wall of the recess 12, as shown in Figs. 2 and 3, and the spring will also lift the dog when said spring is raised.

The longer spring 19 extends from the slot 18 of the dog around the corner of the nut opposite the one wherein the dog is pivoted, and has sufficient length to further extend along the side of the nut it contacts with after being bent around said corner of the nut. While the plate-springs 18 19 may be secured to the nut by rivets or screws for security and to avoid use of such means of attachment which are more costly to produce, it is preferred to affix the spring to the nut by forming an undercut groove in the side of the latter and forcing the end portion of the spring in said groove, which will hold the spring secured, but permits its removal if it is accidentally broken.

The nut 11 is transversely grooved, as at 20, near the free end of the spring, so that the body of the spring may be elevated and correspondingly raise the toe of the dog 13 to remove said toe from a groove of the bolt 10 it has engagement with, by the introduction of a nail or other small lever 21 in the groove 20, to force the spring up and detach the toe of the dog from the groove of the bolt wherein it has been seated, said lever being shown in cross-section in Fig. 5.

In operation the lever 21 is introduced to lift the dog 13 when the nut 11 is to be screwed upon the bolt, which elevation of the dog is maintained until the nut is located against the surface it is to press on, or so that a partial rotation of the nut will draw it into secured condition, the dog before the nut is completely drawn to a position where it is to be locked having its toe on the thread of the bolt between two grooves 16, so that a partial rotation of the nut to further screw it on the bolt will bring the toe of the dog opposite the groove in the latter it is approaching, and the force of the spring 18 or 19 will depress the dog and cause an interlocking engagement of the dog on the nut with the groove of the bolt, which will hold the nut from rotation in any direction.

There is a special advantage attained in the formation of the improved nut-lock as herein described, from the fact that it affords means to utilize a nut having the improvement, as an adjustable collar, that may be firmly secured wherever desired simply by interlocking the dog 13 with a groove of the threaded body with which the nut engages, and it will be seen that the thread may be on a shaft end or the like and the securable nut afford an adjustable collar therefor, and when the nut is formed as a collar its periphery may be circular and have provision made for its rotation, any well-known means for such a purpose being available. As a nut-lock proper for a screw-bolt the improvement is practical and reliable and may be used for the secure locking of a nut on a bolt in any situation where the nut can be moved with a wrench and the small lever 21 be applied to release the dog of the nut-lock.

Having thus fully described my invention, I claim as new and desire to secure by Letters Patent—

In a nut-lock, the combination of a threaded bolt having a longitudinal groove, a nut adapted to screw on the bolt and having a recess formed in one of its sides, one portion of said recess extending through the nut to the central opening thereof, a dog arranged in said recess and pivoted at one end to the nut, said dog being provided at the lower part of its free end with a downwardly-extending projecting toe arranged to engage the groove in the bolt, said dog having a lug projecting from its free end above the toe and spaced apart therefrom to form a recess between the lug and the toe at the free end of the dog, and a spring arranged in the recess with its outer face approximately flush with the side of the nut and adapted to close said recess, said spring being secured at one end to the nut and having its other end arranged in the recess in the free end of the dog, and adapted to hold the dog with its toe normally in position to engage the groove in the bolt, the walls of the nut at opposite sides of the recess in which the spring and dog are mounted being provided with notches extending below the under side of the spring and adapted for the insertion of a tool to operate the spring and swing the dog pivotally in the recess to disengage its toe from the grooved bolt, substantially as set forth.

WILLIAM H. FOSSETT.

Witnesses:
   SIMPSON COX,
   FRED UNFUG.